Nov. 12, 1929.  E. DANNER  1,734,965
METHOD AND APPARATUS FOR FORMING GLASSWARE
Filed Dec. 5, 1921  3 Sheets-Sheet 2
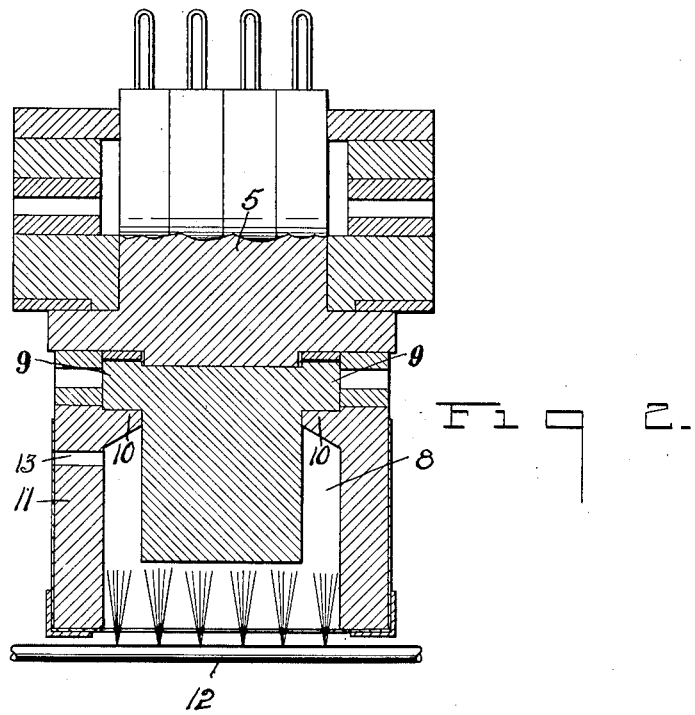
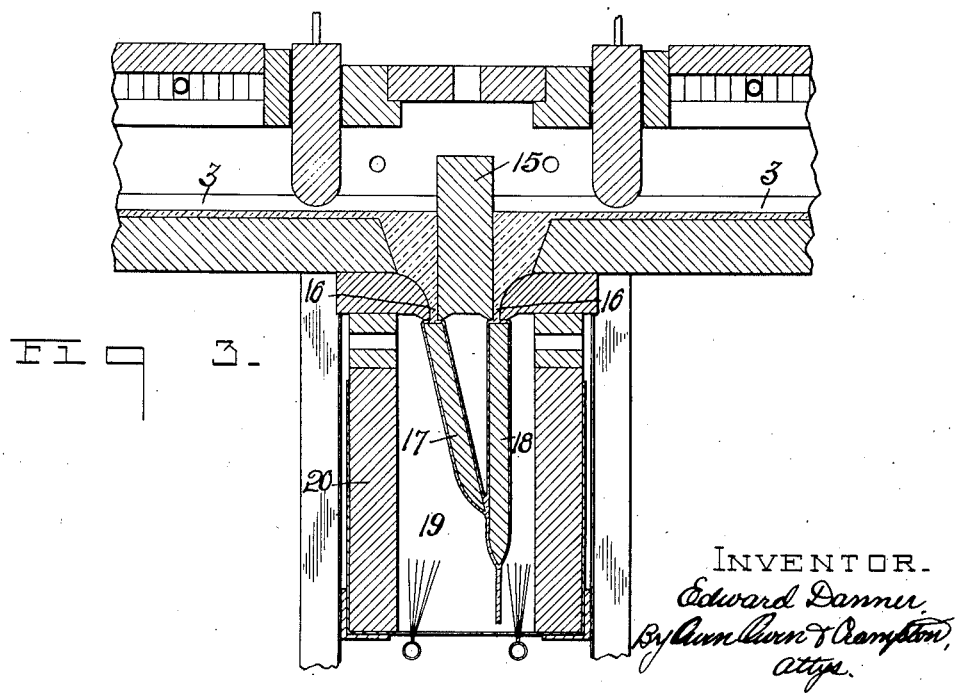
INVENTOR.
Edward Danner Nov. 12, 1929.     E. DANNER     1,734,965
METHOD AND APPARATUS FOR FORMING GLASSWARE
Filed Dec. 5, 1921     3 Sheets-Sheet 3

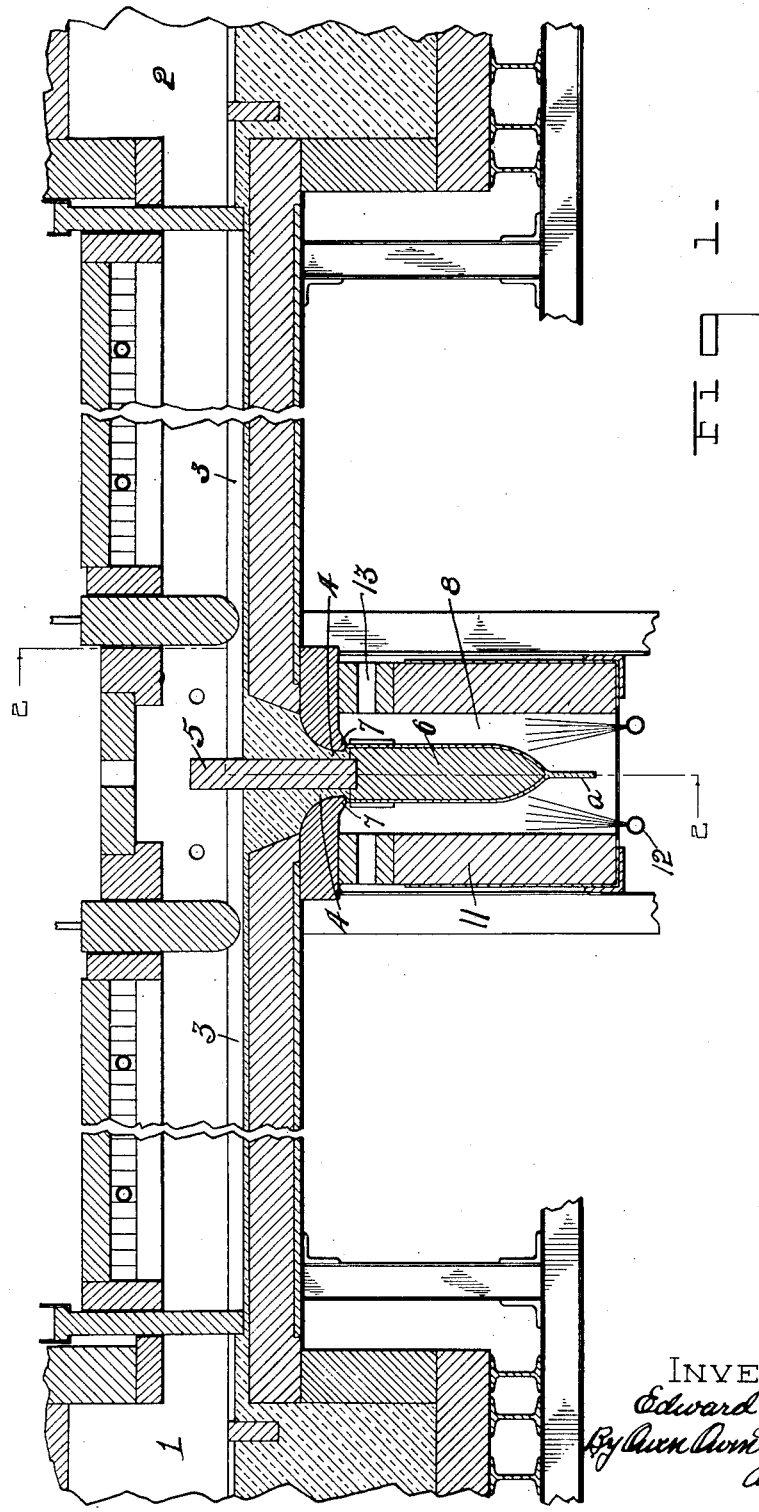

INVENTOR.
Edward Danner,
By Aurn Aurn & Cranston.
Attys.

Patented Nov. 12, 1929

1,734,965

UNITED STATES PATENT OFFICE

EDWARD DANNER, OF TOLEDO, OHIO

METHOD AND APPARATUS FOR FORMING GLASSWARE

Application filed December 5, 1921. Serial No. 519,866.

This invention relates to the manufacture of glassware, and particularly to a method and apparatus for forming sheet glass.

The primary object of the invention is the production in a rapid, efficient and inexpensive manner of glassware, particularly sheet glass of an obscure nature, or having different shades or colors, by flowing two or more films or streams of molten glass, a portion at least of which are of different colors or characteristics from the others, from sources of supply, and uniting the several films or streams into a single stream or sheet, the sources of supply being different, at least for the films having different colors or characteristics.

The invention is fully described in the following specification and while in its broader aspect it is capable of being practiced by numerous apparatus, a few embodiments of such apparatus are illustrated in the accompanying drawings, in which,—

Figure 4:
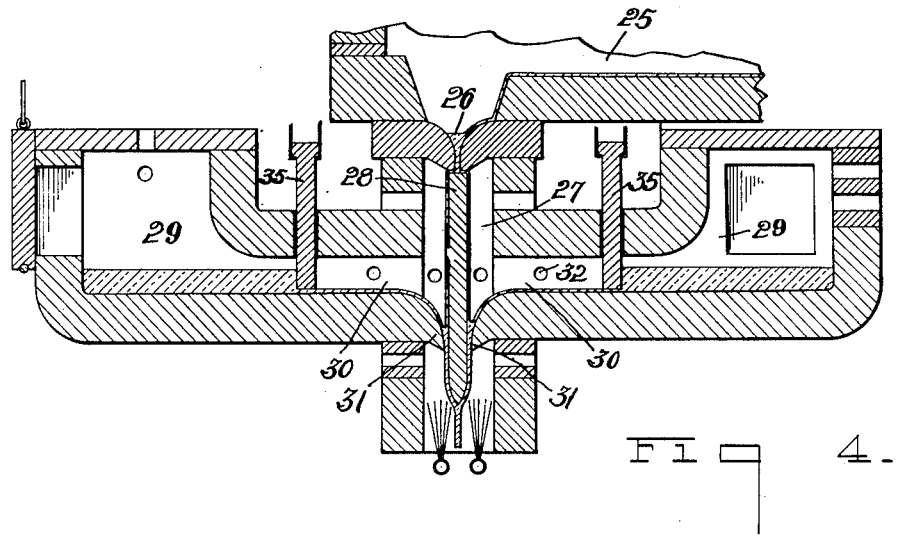
Figure 5:
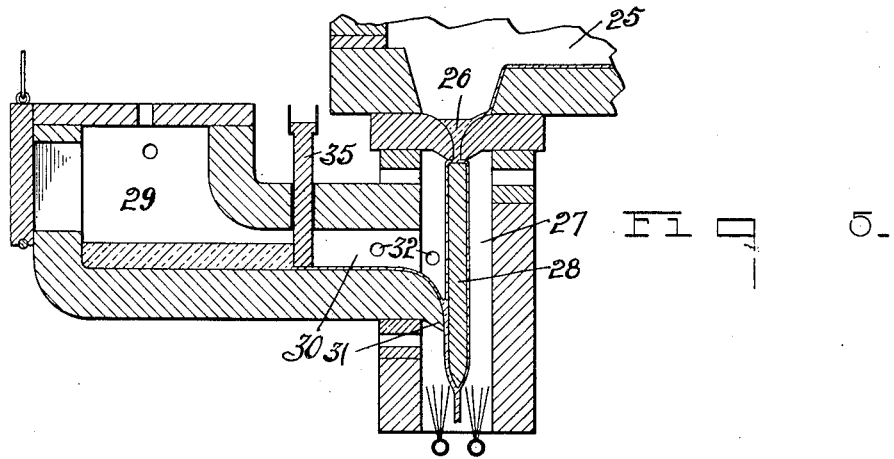

Fig. 1 is a central vertical longitudinal section of an apparatus embodying the invention and by means of which the ware is formed by two streams or films flowing from different sources. Fig. 2 is a cross-section on the line 2—2 in Fig. 1. Fig. 3 is a fragmentary central longitudinal section of a modified form of apparatus, and Figs. 4 and 5 are similar views of different apparatus embodying the invention.

Referring to the drawings, 1 and 2 designate furnaces or tanks each containing a supply of molten glass and which may constitute a melting or refining furnace. A horizontal spout 3 extends from each furnace or tank toward the other and forms a main tempering chamber through which glass flows from the associated tank to a respective bottom discharge outlet opening 4 which is of elongated form transversely of the spout. The discharge slots 4 are transversely spaced relative to each other and are separated by a partition wall 5, which extends up into the meeting ends of the two spouts, which spouts are preferably in open communication one with the other over the partition 5. Glass having different colors or characteristics may be contained in the tanks or furnaces 1 and 2. A directing slab or member 6 extends downward from adjacent to the discharge openings 4 and fits closely at its top against the bottom of the partition 5, being preferably provided with a groove in which the lower edge of the partition seats. The upper end of the directing member 6 forms a downward extension of the partition 5 and causes the thin molten glass stream which flows from each discharge opening 4 to traverse in relatively thin film form down the respective sides of the slab and to unite at the bottom of the slab as fully described in connection with my U. S. Letters Patents Nos. 1,555,358 and 1,697,227, issued September 29, 1925, and January 1, 1929, respectively, the slab terminating at its lower end in a narrow edge to facilitate the joining of the two streams. The upper end of the member 6 is preferably broader than the partition 5 to form shoulders which coact with the lower edges or lips 7 of the spouts 3 to gauge the thickness of the streams of glass flowing from the discharge outlet 4.

The slab or directing member 6 is supported in a tempering chamber 8 in any suitable manner, as for instance, by providing the slab at its side edges near its upper ends with bosses or projections 9 adapted to rest on shelves or projections 10 provided on the inner sides of the walls 11 forming the tempering chamber 8. The temperature within the tempering chamber 8 is maintained in proper condition for tempering the glass flowing down the slab by directing flames into the chamber from burners 12 or in any other suitable manner. While it is usually necessary to effect the heating of the chamber 8 in some manner, occasion might arise calling for the introduction of a cooling medium into the chamber in order to provide the proper tempering condition therein to suit the particular class of ware being acted on. The slab 6 is preferably of less width than the chamber 8 to permit the free circulation of the tempering gases therearound so that a uniform temperature may be maintained within the chamber entirely around the slab. It might be desired, however, in some cases where glass of different natures are used, to heat the glass of one nature higher than another. In such cases a greater heat could be maintained in one part of the chamber than in another part. The walls of the tempering chamber are provided at their upper ends with flues 13 for the outlet of gases from the chamber so that a circulation through the chamber of the tempering gases may be maintained. It will be understood that the stream of glass flowing from the member 6 is taken away as rapidly as formed, permitted to set and then annealed, as well understood in the art.

With this form of apparatus glass of different colors or characteristics may be supplied from the separate sources 1 and 2, and the glass of one stream or film may be of transparent nature, while that of the other may be opal or colored to render the sheet a obscure or other than clear. The outer surfaces of a sheet formed in this manner will be perfectly smooth and fire polished and free from streaks. It is important, however, in forming a sheet from streams of glass flowing from different sources that the coefficient of expansion or contraction of different glasses be the same or nearly so in order that there may be no strains in annealing or cooling which would fracture the sheet. It is evident that a very fine grade or quality of obscure glass can be produced by my invention and that such glass would have advantages which most of the present forms of obscure glass do not have, namely, smoothness of its surfaces. In the manufacture of most forms of obscure glass by the present methods the glass is left rough at one side which is objectionable in that it catches dust and dirt and is difficult to clean.

In the form of apparatus illustrated in Fig. 3, an individual directing member is provided for the glass stream flowing from each discharge outlet, the streams being divided thereby and caused to flow in separated films down opposite sides of the respective slabs, and the two slabs are preferably disposed in downwardly converging relation with the lower edge of one slightly separated from the lower edge or a side of the other, so that the four films flowing down the slabs may unite and flow from the slabs in the form of a single stream or sheet. In this form of apparatus 15 designates the partition dividing the two sources of glass supply, 16 the two transversely separated discharge outlets, 17 and 18 the separate slabs or directing members, and 19 the tempering chamber in which the directing members are disposed and which is formed by the wall 20. It is evident that with this form of the invention, wherein more than two films of molten glass flow through a tempering atmosphere and then merge into a single sheet, the films may be of less thickness and thereby more susceptible to the tempering action than where only two films are employed, thus enabling the final tempering of the glass before the sheet is formed, to be accomplished more rapidly than when only two films are employed, for by increasing the speed of the tempering the speed of formation of a sheet is also increased.

In Fig. 4 an apparatus is illustrated which provides three sources of molten glass supply, one source comprising a chamber 25 in communication with any suitable source of molten glass supply, as for instance, one of those illustrated in Fig. 1, and having a bottom discharge slot or opening 26 in communication at its outlet end with the upper end of a tempering chamber 27. A directing slab or member 28 extends down into the chamber 27 from adjacent to the discharge outlet 26 so that the molten glass discharged thereon from the outlet may flow in thin film form preferably down both sides of the slab, the two films merging and flowing in single sheet form from the lower end of the slab. At each side of the tempering chamber 27, without the same, is located a suitable source of molten glass supply illustrated in the present instance as being in the form of a chamber 29 into which molten glass may be ladled from a melting source, and the chamber 29 has a spout 30 opening into the respective side of the tempering chamber 27. The bottom of each spout terminates in a lip 31 adjacent to the respective side of the slab 28 near its lower end so that a thin film of glass flowing through the spout and over the lip will be caused to join and unite with the film of glass flowing down the respective side of the slab. In this form of apparatus 32 illustrates burner openings so that a proper tempering of the glass films within the chamber 27 may be obtained. The thickness of the streams of glass flowing from the respective sources 29 may be regulated by gates 35.

The apparatus illustrated in Fig. 5 is the same as that of Fig. 4 with the exception that one of the side supply sources is eliminated.

As noted above, it is sometimes desirable, where glass of different natures are used, to heat the glass of one nature to a different temperature than the other. In the form shown in Fig. 3 the glass from the two sources flow different distances in film form, and in Figs. 3, 4 and 5 the glass flows at different angles from the different sources. These different angles necessarily result in different speeds of flow, unless the differences in temperature and nature of the glass should exactly counterbalance the difference in gravity effect resulting from the different angles. In these ways provision is made for treating glass from different sources by different temperatures, and tempering the films while flowing different distances and at different angles and at different rates of speed, the speed of flow being obviously dependent upon the nature of the glass, its temperature, and the angle of the surface over which it flows.

It is evident that sheets having many combinations of colors or tinted shades may be produced by my method in a rapid and inexpensive manner and that a film of glass of opal or other color could be run on one or both sides of a transparent glass or of glass of a different shade or characteristic depending on the appearance and nature of the sheet which it is desired to form.

In my copending application, Ser No. 515,759, filed November 17, 1921, I have illustrated some of the apparatus shown herein and have broadly claimed the forming of a sheet by merging three or more streams or films of flowing glass, and this application is restricted to forming a sheet from two films or more of glass flowing from different sources.

I wish it understood that the method comprising my invention may be modified in numerous respects, and that the apparatus illustrated for practicing the same may be varied without departing from the spirit of the claims.

Having thus described my invention, what I claim as new and desire to secure by Letters Patent, is,—

1. The method of forming continuous glassware, which consists in freely flowing more than two streams, from at least two separate sources of molten glass, through a heated atmosphere and uniting the streams into a single stream before leaving such atmosphere.

2. The method of forming continuous glassware which, consists in flowing more than two streams, from at least two separate sources of molten glass, along a plurality of directing members in the presence of a heated atmosphere, uniting the streams while still molten into a single sheet, and taking the sheet away as rapidly as formed and permitting it to cool.

3. The method of making continuous glassware, which consists in flowing, from at least two separate sources of molten glass, more than two streams over a surface having substantially the same temperature as the molten glass while submitting an exposed face of each stream to the action of tempering gases, and uniting the streams into one article.

4. The method of forming continuous glassware, which consists in freely flowing more than two streams, from at least two separate sources of molten glass, through a heated atmosphere, uniting the streams into a single stream before leaving such atmosphere, and fire-finishing the surfaces of the finished article while controlling the flow of the streams by contact with surfaces thereof which unite in forming said article.

5. The method of forming continuous glassware, which consists in freely flowing more than two streams, from at least two separate sources of molten glass, through a heated atmosphere, uniting the streams into a single stream before leaving such atmosphere, and fire-finishing the surfaces of the streams which become the surfaces of the finished article while controlling the flow of the streams by a member substantially surrounded by molten glass.

6. The method of forming sheet glass, which consists in freely flowing more than two films, from at least two separate sources of molten glass, through a heated atmosphere and uniting the films into a single sheet before leaving such atmosphere.

7. The method of forming sheet glass, which consists in freely flowing through a heated atmosphere more than two films, from at least two separate sources of molten glass, uniting the films into a single sheet before leaving such atmosphere and fire-finishing the film surfaces which become the surfaces of the finished sheet while controlling the flow of the films by contact with surfaces thereof which unite in forming said sheet.

8. The method of forming sheet glass, which consists in freely flowing through a heated atmosphere more than two films, from at least two separate sources of molten glass, uniting the films into a single sheet before leaving such atmosphere and fire-finishing the film surfaces which become the surfaces of the finished sheet while controling the flow of the films by a member substantially surounded by molten glass.

9. The method of forming continuous glassware, which consists in flowing a plurality of streams, from separate sources of molten glass of different natures, subjecting the streams from separate sources to separate heat control, and uniting the streams to form a single article.

10. The method of forming sheet glass, which consists in flowing a plurality of films, from separate sources of molten glass of different natures, heating the glass of one nature higher than the other glass, and uniting the films to form a single sheet.

11. The method of forming continuous glassware, which consists in flowing together, to form a single article, a plurality of streams, from separate sources of molten glass of different natures, heating the glass of one nature higher than the other glass, and fire-finishing the surfaces of the streams which form the surface of the finished article while controlling the flow of the streams by contact with surfaces thereof that unite in forming the finished article.

12. The method of forming sheet glass, which consists in flowing together, to form a single sheet, a plurality of films, from separate sources of molten glass of different natures, heating the glass of one nature higher than the other glass, and fire-finishing the surfaces of the films which become the surfaces of the sheet while controlling the flow of the films by contact with surfaces that unite in forming the sheet.

13. The process which consists in passing molten glass in film form from separate sources to a converging point where they unite while still molten to form a sheet, and, while so passing the films, controlling their direction and speed by contact of solid members with portions that are embedded in the finished sheet while the portions which subsequently form the surfaces of the finished sheet are contacted by gases only.

14. The method of producing sheet glass, which consists in passing films of glass downward from separate containers, causing the films from the different containers to flow in film form at different angles to the vertical and to converge and form a single sheet, and guiding the converging streams by means within the glass and extending below the containers.

15. The method of producing sheet glass, which consists in forming more than two films of molten glass, from at least two separate sources, and guiding said films in converging direction, by contact with the surfaces of the films on their sides toward each other, until said sides unite and the films form a single sheet.

16. The process of forming sheet glass, which consists in flowing a plurality of films from separate sources, flowing films from different sources at different angles to the vertical and in converging directions to form a single sheet and contacting only by gas film surfaces that subsequently form the sheet surfaces while guiding the converging films by solid members contacting their inner surfaces.

17. The process of forming sheet glass having layers of glass of different characteristics, which consists in flowing a plurality of films of glass from separate sources, flowing the films from different sources in film form for different distances and in converging direction until they form a single sheet, and contacting with guiding means, film surfaces which subsequently unite while the outer surfaces of the outer films are contacted by gas only.

18. In apparatus for forming continuous glassware, a plurality of directing members, and means, comprising at least two separate sources of molten glass, for supplying molten glass to substantially surround each member, the members being so arranged that glass flowing around and from them will unite and form one article.

19. In apparatus for forming sheet glass, separate receptacles for molten glass, there being slots in said receptacles from which films of molten glass issue, and means in position to contact inner surfaces of films thus issuing and guide and control the movement of the glass, said means extending below any members contacting the exterior surfaces of the exterior films and the guiding means for different films being at different angles.

20. In apparatus for forming sheet glass, separate receptacles for molten glass, there being slots in said receptacles from which films of molten glass issue, and means in position to contact inner surfaces of films thus issuing and guide and control the movement of the glass, said means extending below any members contacting the exterior surfaces of the exterior films and the guiding means for different films being at different angles, the guiding surfaces of said means being of different lengths for different films.

21. In apparatus for forming sheet glass, a receptacle having a slot in its bottom, a member arranged centrally of said slot and around which the glass flows in divided films which unite, when past the member, to form a sheet, a second receptacle, and means to guide a film of glass from said second receptacle to unite with the sheet and form a surface layer thereof, the guide being different from said member.

22. In the method of making sheet glass, the steps consisting in supplying a stream of molten glass to one side of a flow opening from one source, supplying another stream of molten glass to the other side of the flow opening from another source, and separately regulating said streams.

23. In the method of making sheet glass, the steps consisting in withdrawing glass in a plurality of streams from separate sources, bringing the streams together, and flowing the glass from the united streams downwardly into a sheet.

24. In the method of making sheet glass, the steps consisting in withdrawing glass in a plurality of streams from separate sources, bringing the streams together, flowing the glass from the united streams downwardly into a sheet, and separately regulating the streams.

In testimony whereof I have hereunto subscribed my name to this specification.

EDWARD DANNER.